United States Patent [19]
Guymon, II

[11] Patent Number: 5,657,027
[45] Date of Patent: Aug. 12, 1997

[54] TWO DIMENSIONAL INTERFEROMETER ARRAY

[75] Inventor: Boyd E. Guymon, II, Culver City, Calif.

[73] Assignee: Hughes Electronics, Los Angeles, Calif.

[21] Appl. No.: 672,900

[22] Filed: Jun. 2, 1996

[51] Int. Cl.⁶ .................................................... G01S 5/04
[52] U.S. Cl. ........................ 342/445; 342/442; 342/446
[58] Field of Search ............................... 342/442, 445, 342/446, 424, 156

[56] References Cited

U.S. PATENT DOCUMENTS

| | | | |
|---|---|---|---|
| 4,780,722 | 10/1988 | Cusdin | 342/437 |
| 4,809,012 | 2/1989 | Tong | 343/853 |
| 5,084,709 | 1/1992 | Baghdady | 342/442 |
| 5,089,824 | 2/1992 | Uematsu et al. | 342/359 |
| 5,493,308 | 2/1996 | Bingham et al. | 342/442 |
| 5,568,154 | 10/1996 | Cohen | 342/443 |
| 5,572,220 | 11/1996 | Cai | 342/442 |

*Primary Examiner*—Theodore M. Blum

[57] ABSTRACT

Apparatus and a processing method that determine accurate angle of arrival data indicative of the direction to an emitter. An accurate angle of to the emitter using four antennas and receiver channels (processor). The present invention provides for an ambiguity function that is an implementation of a four-channel two-dimensional interferometer array. The interferometer array and method provide for a reference antenna and second, third and fourth antennas disposed in a predetermined plane with the reference antenna and offset from the reference antenna at locations such that no two antennas lie along a straight line that includes the reference antenna. Receivers are coupled to the antennas for detecting RF energy derived therefrom. Phase comparators make three phase difference measurements ($\phi_1$, $\phi_2$ and $\phi_3$). A processor performs ambiguity elimination and angle determination computations to determine azimuth and elevation angle of arrival data indicative of the direction of arrival of energy derived from the emitter. The processing method is implemented in the processor and computes an ambiguity factor relating the spatial locations of the antenna, looks up the ambiguity factor value in a precomputed ambiguity table and find the associated factors $N_2$ and $N_3$, which correspond to a respective number of integer cycles of RF energy that can occur from the time a plane wavefront hits one of the antennas until this wavefront hits the reference antenna, computes two unambiguous phase values, and computes azimuth and elevation angles to the emitter.

6 Claims, 5 Drawing Sheets

Phase Calibration Phase Error

TWO DIMENSIONAL INTERFEROMETER ARRAY

BACKGROUND

The present invention relates generally to interferometers, and more particularly, to a two dimensional interferometer array for use with radar warning receivers requiring accurate angle of arrival data for targeting.

Certain electronic warfare systems require accurate angle of arrival data to precisely locate emitters for targeting purposes using vertical or horizontal triangulation. Emitter pulse tracking under restrictive jammer lookthrough constraints also requires accurate angle of arrival data. Previously, two dimensional interferometer arrays developed by the assignee of the present invention required five antenna elements and receiver channels to simultaneously determine accurate azimuth and elevation angle of arrival data. For example, fielded electronic support measures (ESM) systems use five antennas and five receiver channels to provide simultaneous azimuth and elevation angle of arrival data. Adding a fifth channel to an AN/ALR-67V(3) ASR radar warning receiver manufactured by the assignee of the present invention, for example, would be very costly.

Accordingly, it is an objective of the present invention to provide for a two dimensional interferometer array for use with radar warning receivers that generates accurate angle of arrival data using only four antennas and four receiver channels.

SUMMARY OF THE INVENTION

To meet the above and other objectives, the present invention provides for a two dimensional interferometer array and processing method that is used to determine accurate angle of arrival data to determine the direction to an emitter. Certain electronic warfare systems require measurement of both azimuth and elevation angle of arrival on each intercepted radar pulse. The present invention determines an accurate angle of arrival of the radar pulse or emitted RF energy from the emitter using four antenna elements and receiver channels. The present invention provides for an "ambiguity function" that is an implementation of a four-channel two-dimensional interferometer array.

The interferometer array and method provide for a reference antenna and second, third and fourth antennas disposed in a predetermined plane with the reference antenna and offset from the reference antenna at locations such that no two antennas lie along a straight line that includes the reference antenna.

RF energy from the four antennas are detected by four receivers, and then three phase difference measurements ($\phi_1$, $\phi_2$ and $\phi_3$) are made using three comparators. These phase measurements are ambiguous due to the fact that the receivers can only measure phase from $-\frac{1}{2}$ to $+\frac{1}{2}$ cycles of RF energy. The true phase is equal to the measured value $\pm$ a number of additional cycles of the RF energy. The ambiguous phase data are transferred to a general purpose computer which performs ambiguity elimination and angle determination as follows:

(1) Compute Amby=$C_1\phi_1+C_2\phi_2+C_3\phi_3$
where
$C_1=x_3y_2-x_2y_3$
$C_2=x_1y_3-x_3y_1$
$C_3=x_2y_1-x_1y_2$
and where $(x_1, y_1)$ is the spatial location of the second antenna, $(x_2, y_2)$ is the spatial location of the third antenna, and $(x_3, y_3)$ is the spatial location of the fourth antenna. $C_1$, $C_2$ and $C_3$ are constants for any given array configuration.

(2) Lookup the value of Amby in a precomputed table (see below) and find the associated factors $N_2$ and $N_3$.

(3) Compute the two unambiguous phase values $\Phi_2$ and $\Phi_3$
$\Phi_2=\phi_2+N_2$
$\Phi_3=\phi_3+N_3$.

(4) Compute the azimuth and elevation angles to the emitter:
Elevation angle=$\gamma=\sin^{-1}[(x_3\Phi_2-x_2\Phi_3)/C_1]$
Azimuth angle=$\psi=\sin^{-1}[y_2\Phi_3-y_3\Phi_2)/C_1/\cos(\gamma)]$ Ambiguity Table:
The ambiguity table is constructed off-line by enumerating all possible combinations (M) of $N_1$, $N_2$ and $N_3$ over the array's field of view from the following:

Amby$_i=-N_1-K_2N_2-K_3N_3$, (i=1, 2, . . . , M), where $K_2=C_2/C_1$ and $K_3=C_3/C_1$.

The values in the table Amby$_i$ are constant for any given array configuration (i.e., location of the antennas 12–14). In order to design an array configuration, the spatial locations of the second, third and fourth antennas 12–14, which determines $C_1$, $C_2$ and $C_3$ and hence $K_2$ and $K_3$, are picked so that the values (Amby$_i$) in the table are unique for each combination of $N_1$, $N_2$ and $N_3$.

The ambiguity function is used to implement the four element two dimensional interferometer. Two array configurations were constructed and tested in an anechroic chamber. Very good agreement was found between the test data and data derived from computer based simulations. Four-element two dimensional interferometer arrays in accordance with the present invention provide simultaneous azimuth and elevation angle of arrival data. The four-element two dimensional interferometer array provides angle of arrival accuracy sufficient for pulse train deinterleaving and course emitter location.

The present invention may be used with electronic warfare systems such as with a four-channel AN/ALR-67(V)3 radar warning receiver to provide accurate angle of arrival data. This modification to the ASR radar warning receiver, coupled with the four-element two dimensional interferometer array, provides for the determination of accurate angle of arrival data at a lower cost than conventional or other competitive approaches. The present invention thus reduces the cost of electronic warfare equipment, such as radar warning receivers, for example, by up to 20 percent for systems requiring accurate angle of arrival data.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 7 shows a graph comparing predicted and measured test data for the array of FIG. 5a;

FIG. 9 shows the residual phase error for the for the array of FIG. 5a; and

DETAILED DESCRIPTION

Figure 1:
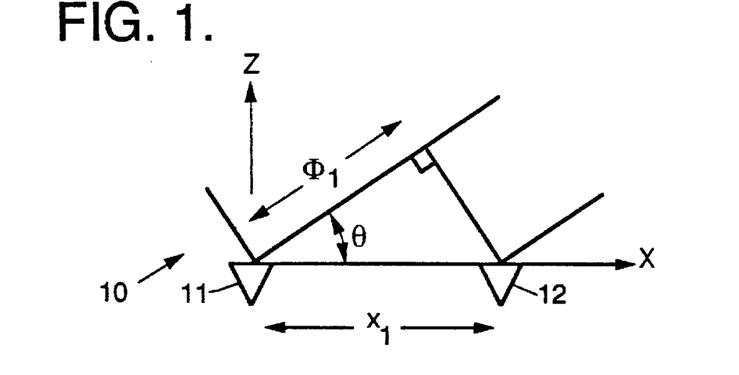
FIGS. 1 and 2 illustrate two and three element interferometers useful in understanding the operation of a linear array.

By way of background, FIG. 1 illustrates a two-element interferometer 10 or interferometer array 10 that may be used to determine the angle of arrival of energy derived from an RF emitter by measuring the phase difference between a reference antenna 11 and a second antennas 12. With reference to FIG. 1, the relationship between phase and the angle of arrival is given by the equation $$\Phi_1 = x_1 \cos(\theta) \quad (1)$$

where, $x_1$ is the separation in cycles of wavelengths at the upper frequency limit of the array 10, $\Phi_1$ is the total phase difference in cycles, and $\theta$ is the angle of arrival. In equation (1), $\Phi_1$ is the total phase difference (unwrapped phase) which, in general, includes a measured component ($\phi_1$) in the range from −0.5 cycles to +0.5 cycles plus a number of additional integer cycles ($\pm N_1$). That is $\Phi_1 = \phi_1 \pm N_1$. If the separation distance ($x_1$) between antennas 11, 12 is sufficiently small, and/or the field of view (FOV) is restricted, then equation (1) can be solved directly for $\theta$, which is given by $$\theta = \cos^{-1}(\phi_1/x_1). \quad (2)$$

However, practical systems require a large field of view (generally ±60 degrees about the boresight of the array 10) and a large separation distance between antennas 11, 12 to provide sufficient angle of arrival accuracy. In this case, equation (1) has multiple solutions:

$$\theta = \cos^{-1}[(\phi_1 + N_1/x_1)]. \quad (3)$$

where $N_1$ can be any one of the following integer values:

−Integer[$x_1$ sin(FOV)], ..., 0, ..., +Integer[$x_1$ sin(FOV)].

Figure 2:
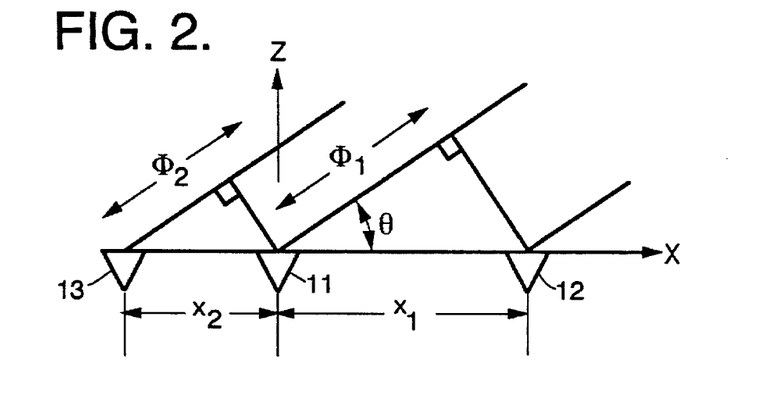

To resolve these ambiguities, a third antenna 13 is added to the array 10 of FIG. 1 as is shown in FIG. 2. The third antenna 13 is placed at a distance $x_2$ from the reference antenna 11. Measured phase information from the third antenna 13 is used to resolve the ambiguities.

An "ambiguity function" is used to determine the correct number of integer cycles of phase $N_1$ and $N_2$ from the measured values of phase $\phi_1$ and $\phi_2$. To derive the ambiguity function, first define:

$$\Phi_1 + K_2 \Phi_2 = 0 \quad (4)$$

and from equation (1)

$$x_1 \cos(\theta) + K_2 x_2 \cos(\theta) = 0$$

and therefore $$K_2 = -x_1/x_2. \quad (5)$$

Now, define the ambiguity function (Amby) as $$\text{Amby} = \Phi_1 + K_2 \Phi_2$$

$$\text{Amby} = (\phi_1 - N_1) + K_2(\phi_2 - N_2) \quad (6)$$

and using equation (4), $$\text{Amby} = -N_1 - K_2 N_2. \quad (7)$$

In order to design an ambiguity free linear array 10, a value must be picked for $K_2$ (which by equation (5) is the ratio of the distances between antennas 11, 12, 13) such that the ambiguity function is unique for all possible values of $N_1$, and $N_2$. Typical values for $K_2$ are ⅔ and ¾. The ambiguity function is then used to determine the angle of arrival of RF energy received from an emitter from the measured phase in the following manner.

For all possible combinations of $N_1$ and $N_2$, a precomputed ambiguity table of Amby versus $N_1$ and $N_2$ is generated using equation (7). The number of combinations determines the number of entries in the ambiguity table. This is a one-time off-line process.

Two phase measurements are made and Amby values are computed using equation (6).

The value of Amby is looked up in the precomputed ambiguity table, thus finding $N_1$.

The angle of arrival ($\theta$) of the RF energy from the emitter is computed using equation (3).

Determination of the ambiguity function for a two dimensional interferometer array 10 will now be discussed with reference to FIG. 3, which illustrates a conventional five element interferometer 10. In the past, two linear arrays 10a, 10b were used to obtain both azimuth and elevation angle of arrival data. The two arrays 10a, 10b were arranged in an orthogonal configuration, and the reference antenna 11 was shared between the two arrays 10a, 10b. Phase centers of the antennas are in the X-Y plane. The Z axis completes the right handed orthogonal coordinate system, and it is in the direction the boresight of the array 10. Antennas 11, 12, 13 (also labeled "0""1" and "2") provide azimuth angle of arrival data, while antennas 11, 14, 15 (also labeled "0", "3" and "4") provide elevation angle of arrival data.

Figure 3:
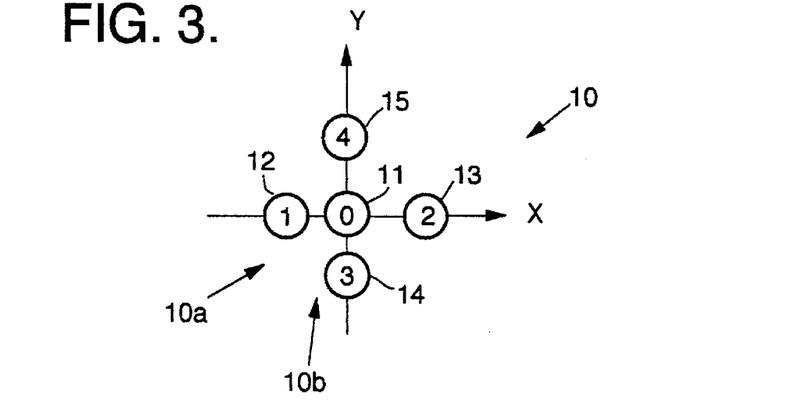
FIG. 3 illustrates a conventional five element interferometer.
Figure 4:
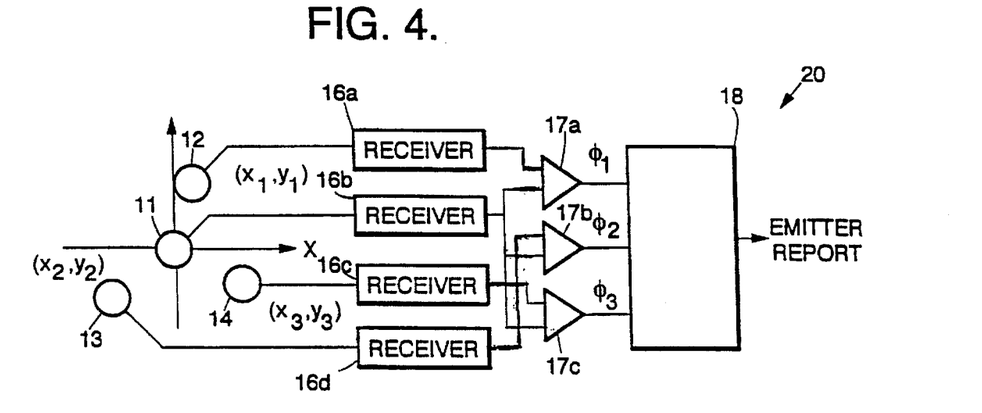
FIG. 4 illustrates a two dimensional interferometer array in accordance with the principles of the present invention.

In contrast to the interferometer 10 of FIG. 3, the present invention obtains both azimuth and elevation angle of arrival data using only four antennas 11–14 rather than five antennas 11–15. FIG. 4 illustrates a two dimensional interferometer array 20 in accordance with the principles of the present invention. The array 20 includes a reference antenna 11 and three additional antennas 12, 13, 14. RF energy from each of the four antennas 11–14 is first detected by the four receivers. Next, the difference in phase of the three additional antennas 12, 13, 14 relative to the reference antenna 11 is determined. These three phase measurements ($\Phi_1$, $\Phi_2$ and $\Phi_3$) are then sent to a general purpose processor which performs ambiguity elimination and generates azimuth and elevation angle of arrival data relating to the detected RF energy.

A derivation of the equations used to determine azimuth and elevation angle of arrival data with four antennas 11–14 using the present invention is discussed below. Using a coordinate system with a reference antenna 11 at its origin, three other antennas 12, 13, 14 are placed in the X-Y plane at the general coordinates shown in FIG. 4.

The magnitude of each antenna vector is $$d_i = (x_i^2 + y_i^2)^{1/2}$$

and a unit vector to the emitter is given by $$e = [e_x\ e_y\ e_z].$$

The angle between each of the antenna vectors and the vector to the emitter is determined from the definition of a vector dot product:

$$d_i \cos(\theta_i) = e \cdot [x_i\ y_i\ z_i] \text{ for } i=1, 2, 3.$$

However, $d_i \cos(\theta_i) = \Phi_i$ and $z_i = 0$, and so $$\phi_i = e \cdot [x_i\ y_i\ 0]$$

and therefore $$\Phi_i = x_i e_x + y_i e_y \tag{8}$$

where $e_x$ and $e_y$ are direction cosines to the emitter and have the following relationship to the azimuth ($\psi$) and elevation ($\gamma$) angles $$e_x = \cos(\gamma)\sin(\psi)$$

$$e_y = -\sin(\gamma). \tag{9}$$

In order to compute the ambiguity function, let:

$$\Phi_1 + k_2 \phi_2 + k_3 \phi_3 = 0 \tag{10}$$

Substitute equation (8) into equation (10) and collect terms with identical direction cosines:

$$e_x(x_1 + K_2 x_2 + K_3 x_3) + e_y(y_1 + K_2 y_2 + K_3 y_3) = 0. \tag{11}$$

Equation (11) is independent of the angle to the emitter, and therefore, $$x_1 + K_2 x_2 + K_3 x_3 = 0$$

$$y_1 + K_2 y_2 + K_3 y_3 = 0. \tag{12}$$

Solving equations (12) for $K_2$ and $K_3$ yields:

$$K_2 = (x_1 y_3 - x_3 y_1)/(x_3 y_2 - x_2 y_3)$$

$$K_3 = (x_2 y_1 - x_1 y_2)/(x_3 y_2 - x_2 y_3). \tag{13}$$

Define the ambiguity function (Amby) as $$\text{Amby} = \phi_1 + K_2 \phi_2 + K_3 \phi_3$$

$$\text{Amby} = (\Phi_1 - N_1) + K_2(\Phi_2 - N_2) + K_3(\Phi_3 - N_3), \tag{14}$$

and using equation (10), $$\text{Amby} = -N_1 - K_2 N_2 - K_3 N_3. \tag{15}$$

To design an ambiguity-free two dimensional array 20, values must be picked for $K_2$ and $K_3$ such that the ambiguity function is unique for all possible values of $N_1$, $N_2$ and $N_3$. The ambiguity function is used to determine angle of arrival from the measured phase in the following manner.

In general, the values $N_i$ ($i=1, 2, 3$) are integer number of cycles of RF energy that can occur from the time a plane wavefront hits an antenna 12, 13, 14 until this wavefront hits the reference antenna 11. If the distance is given by $d_i = (x_i^2 + y_i^2)^{1/2}$ then $N_i$ can be any one of the integer values given by $-\text{Integer}[x_i \sin(\text{FOV})], \ldots, 0, \ldots, +\text{Integer}[x_i \sin(\text{FOV})]$. Not all combinations of $N_i$ are possible. Which combinations are possible depends upon the configuration of the array 10.

For all possible combinations of $N_1$, $N_2$ and $N_3$, the precomputed ambiguity table of Amby versus $N_1$, $N_2$ and $N_3$ is generated using equation (15). This is a one-time off-line process.

Three phase measurements are made and Amby values are computed using equation (14).

The computed value of Amby is looked up in the precomputed ambiguity table, thus finding $N_2$ and $N_3$.

The direction cosines of the emitter are computed using equation (8):

$$\Phi_2 = (\phi_2 + N_2) = x_2 e_x + y_2 e_y \tag{16}$$

$$\Phi_3 = (\phi_3 + N_3) = x_3 e_x + y_3 e_y$$

$$e_x = (y_3 \Phi_2 + y_2 \Phi_3)/(x_3 y_2 - x_2 y_3) \tag{17}$$

$$e_y = (x_3 \Phi_2 + x_2 \Phi_3)/(x_3 y_2 - x_2 y_3).$$

Therefore, from equations (9), the elevation angle ($\gamma$) and azimuth angle ($\psi$) are given by:

$$\gamma = \sin^{-1}(e_y) \tag{18}$$

$$\psi = \sin^{-1}[e_x/\cos(\gamma)].$$

The above derivation assumes that the signal of interest derived from the emitter is at the upper frequency limit of the array 20. As the RF frequency of the signal radiated by the emitter decreases, the calculated value of Amby must be increased by the following factor before looking up its value in the ambiguity table:

$$\text{Factor} = [(\text{upper frequency limit})/(\text{RF frequency of the emitter})]^2 \tag{19}$$

Also, as the RF frequency of the signal radiated by the emitter decreases, some of the entries in the ambiguity table may be eliminated. This is because at lower frequencies, some values of $N_1$, $N_2$ and $N_3$ are not possible. Removing these entries in the ambiguity table reduces the chance of picking the wrong one.

The first step performed in developing the present two dimensional interferometer array 20 was to develop the ambiguity function as described above. The ambiguity function was analyzed to determine locations for the antennas 11–14. Without loss of generality, the ambiguity function may be written as follows:

$$\text{Amby} = C_1 \phi_1 + C_2 \phi_2 + C_3 \phi_3 \tag{19}$$

where, $$C_1 = x_3 y_2 - x_2 y_3$$

$$C_2 = x_1 y_3 - x_3 y_1$$

$$C_3 = x_2 y_1 - x_1 y_2. \tag{20}$$

These coefficients are the magnitude of the vector cross product of pairs of antenna vectors. Since each of these antenna vectors lies in the X-Y plane, each cross product vector is perpendicular to this plane. In order for the ambiguity function to be unique for all measured phase values, the coefficients of equation (19), and particularly the vector magnitudes, must be prime relative to each other. Also, each coefficient must not be zero. This implies that no two antennas 12, 13, 14 lie along a straight line that includes the reference antenna 11.

A "brute force" approach was taken to determine candidate locations for the antennas 12–14. This approach included picking locations for the second and third antennas 12, 13 and then evaluating the ambiguity function for all possible locations (within a boundary) for the fourth antenna 14. The evaluation criteria used was as follows. (1) Each location in the ambiguity table must have unique values for $N_1$, $N_2$ and $N_3$. (2) The step size between ambiguity function values in the ambiguity table of ambiguity (Amby) values must exceed a minimum value.

Condition (1) ensures that the ambiguity function is free of ambiguities, and condition (2) increases the likelihood that phase measurement errors do not corrupt the value of Amby so that the wrong location in the ambiguity table is picked. However these criteria do not constrain the accuracy with which angle of arrival is effected by phase measurement errors. The two criteria above only lessen the number of locations that provide good angle of arrival performance.

The next step taken was to evaluate each candidate location for the antennas 12–14 with respect to angle of arrival performance. In this analysis, random azimuth and elevation angles were drawn over the field of view. For each pair of angles, random phase measurements were drawn for each antenna 11–14. A normally distributed random variable with standard deviation of ten degrees was used for phase measurement errors. Ten degrees is typical of what can be expected from a fielded calibrated system. The procedure previously outlined using equations (18) was then used to compute azimuth and elevation angle of arrival data. Statistics on the difference between computed and actual angle of arrival data were collected across the field of view. The percentage of deleted measurements was also collected. Deleted measurements occur when the absolute value of the arguments of the $\sin^{-1}$ functions exceeded 1.0 or when the computed value for the angle of arrival was outside the field of view.

A great number of computer simulations for different trial antenna locations were investigated. A ten degree RMS phase error was assumed. The array configuration with the best angle of arrival performance and lowest deletion rate was picked for testing in an anechroic chamber. Locations for the antenna 11–14 and simulated performance for this array 20 are shown in FIGS. 5a, 5b, 6a and 6b.

The antennas 11–14 used in the array 20 during testing were Tecom planar cavity-backed spiral antennas, Type 201354. These antennas 11–14 have an operating frequency range from 5 to 11 GHz. They have left hand circular polarization and have a diameter of 1.25 inches. This diameter is about 25 percent greater than what can be expected from state-of-the-art spiral antennas. This limited the upper frequency range for testing to 9 GHz. Test data was also collected at 7 GHz and at 5 GHz to verify performance at frequencies below the maximum design frequency of the array 20.

Figure 5A:
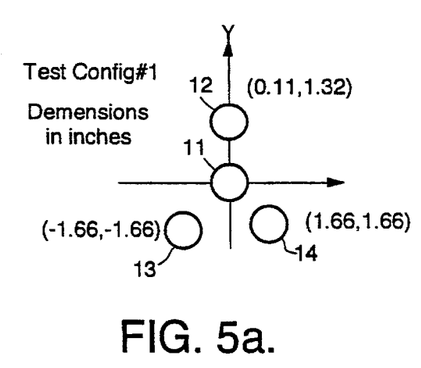
FIG. 5a and 5b show a first array that was tested and test results therefrom.
Figure 5B:
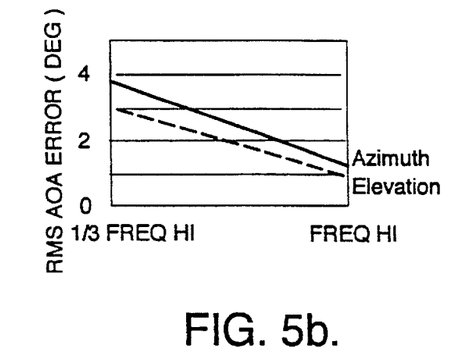

Using a trial and error procedure independent of the methods described herein, a configuration was found that was tested. The locations of the antennas 11–14 and simulated performance (with ten degrees RMS phase error) for this array 20 are shown in FIGS. 5a and 5b. Holding two of the antenna locations constant and using the ambiguity function approach, a candidate array configuration was found that matched Configuration #2 shown in FIG. 6a to within 0.125 inches. The simulated performance of this array 20 is shown in FIG. 6b.

Figure 6A:
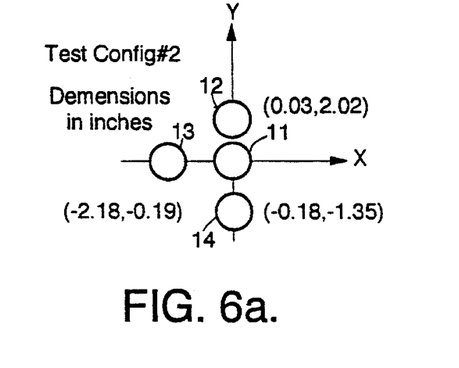
FIG. 6a and 6b show a second array that was tested and test results therefrom.
Figure 6B:
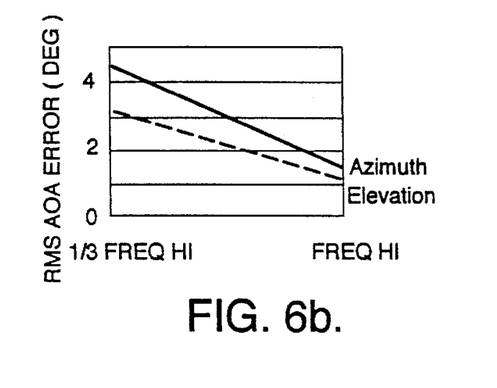

The arrays 20 (Configuration #1, Configuration #2) shown in FIGS. 5a and 6a were fabricated and tested in an anechroic chamber. The arrays 20 were tested at frequencies of 5, 7 and 9 GHz. Two elevation fields of view (plus and minus) were used. Ten elevation angles (0, 5, 10, . . . 40 and 43 degrees) and ninety-one azimuth angles (−90 to +90 in 2 degree steps) were measured. Three antenna phase angle measurements were made, and 32,760 data samples were collected.

Figure 7:
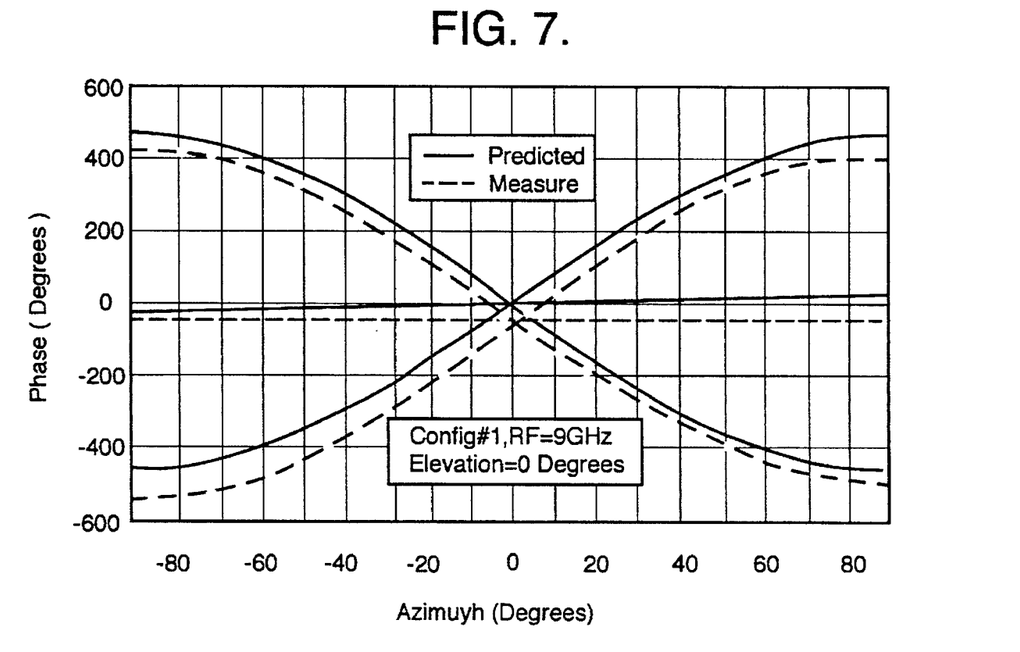

A comparison was made between the unwrapped measured phase and that predicted by equation (8). An example of this comparison is given in FIG. 7. FIG. 7 shows data for Configuration #1 at 9 GHz for zero elevation angle. The measured phase data has a large bias. Inspection of the data indicates that four bias sources were present. Newton's method was used to find values for each bias by minimizing the root-mean-square (RMS) error between the measured phase and the predicted phase. Table 1 itemizes the bias sources and gives the value determined for each.

TABLE 1

| Bias source | Configuration #1 | Configuration #2 |
|---|---|---|
| Antenna #1 phase bias (inches) | −0.16 | −0.16 |
| Antenna #2 phase bias (inches) | −0.16 | −0.17 |
| Antenna #3 phase bias (inches) | −0.21 | −0.22 |
| Rotation angle about boresight (degrees) | 1.19 | 1.56 |

Bias sources for the antennas 20 were converted to degrees at each test frequency. The antenna biases are made up of a large component that was traced back to the test equipment, and a smaller component that was due to the antennas 11–14. The rotation error was due to a misalignment between the array 20 and its test fixture.

Figure 8A:
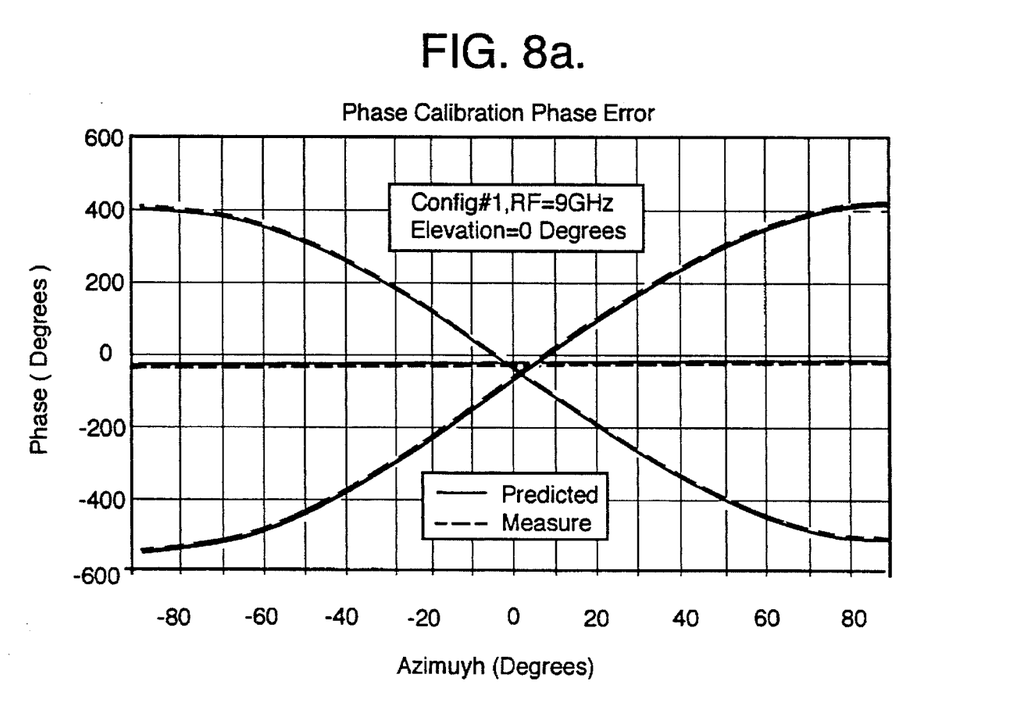
FIGS. 8a and 8b show phase comparison graphs for the array of FIG. 5a after bias removal.
Figure 8B:
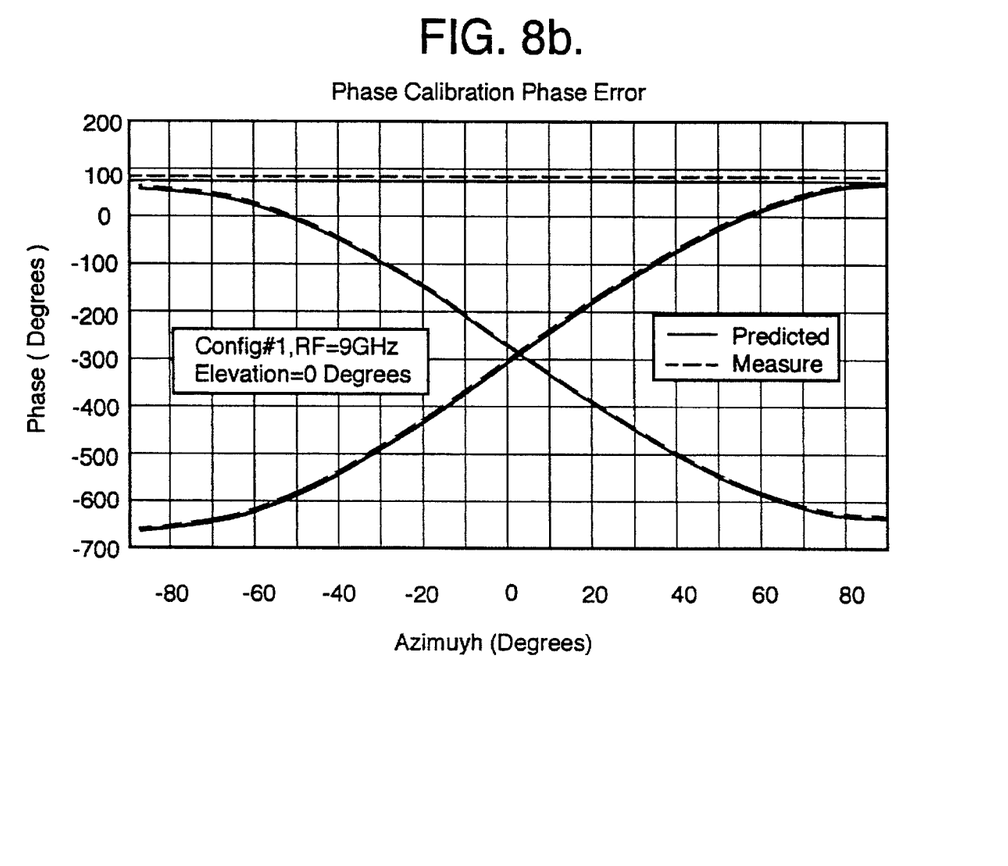
Figure 9:
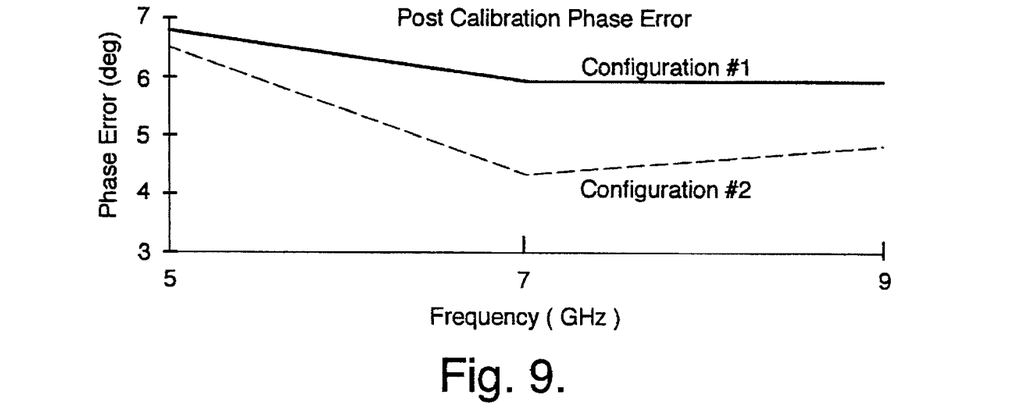

Examples of the excellent agreement between the measured and predicted phase are shown in FIGS. 8a and 8b. The data shown in FIGS. 8a and 8b are for Configuration #1 at 9 GHz. Applying the biases to the predicted phase values resulted in the residual RMS phase error shown in FIG. 9.

Figure 10A:
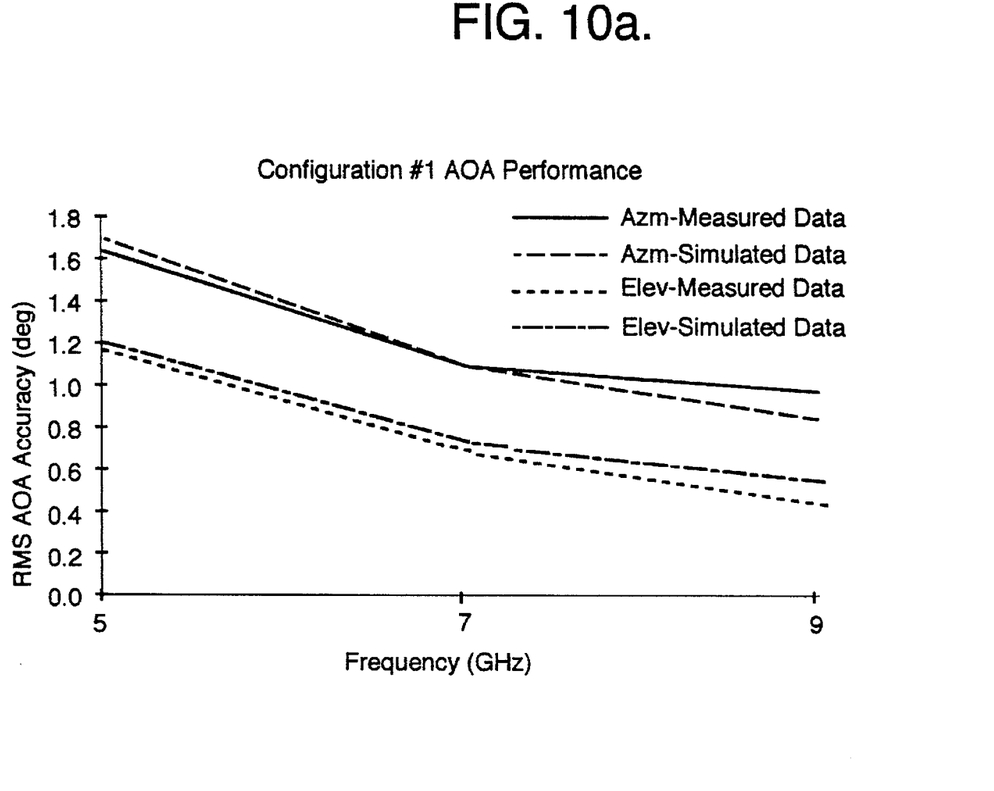
FIGS. 10a and 10b show performance data for the arrays of FIGS. 5a and 5b, respectively.
Figure 10B:
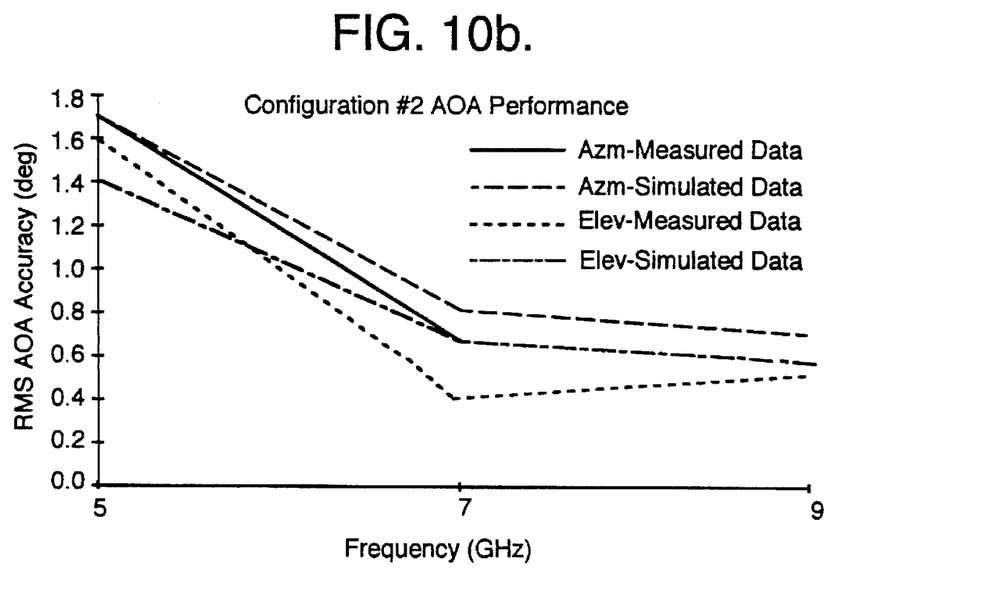

Performance of the interferometer arrays 20 will now be discussed. The ambiguity table was constructed for each of the two dimensional interferometer arrays 20. The measured phase data was processed using the procedure outlined above. Simulated phase data with an appropriate RMS phase error were also processed using the same procedure. The results for both arrays 20 are given as a function of frequency in FIGS. 10a and 10b. Good agreement was found between angle of arrival from measured and simulated data.

The ambiguity function approach to the design and use of two dimensional interferometer arrays 20 to provide simultaneous azimuth and elevation angle of arrival data is thus provided by the present invention. Using twenty percent less hardware than a conventional five-element array 10, the present four-element interferometer array 20 provides angle of arrival accuracy sufficient for pulse train deinterleaving and course emitter location.

Thus, a two dimensional interferometer array for use with radar warning receivers requiring accurate angle of arrival data for targeting has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. Apparatus for simultaneously generating azimuth and elevation angle of arrival data indicative of the direction of arrival of energy derived from an emitter, said apparatus comprising:
   a reference antenna and second, third and fourth antennas disposed in a predetermined plane with the reference antenna and offset from the reference antenna at locations such that no two antennas lie along a straight line that includes the reference antenna;
   receiver means respectively coupled to the reference, second third and fourth antennas for detecting RF energy derived from the antennas;

phase comparison means coupled to the receiver means for, making three phase difference measurements ($\phi_1$, $\phi_2$, $\phi_3$) of the received signals; and processor means for performing ambiguity elimination and angle determination computations to determine azimuth and elevation angle of arrival data indicative of the direction of arrival of energy derived from the emitter, wherein the processor means is programmed to perform the following:

(1) compute an ambiguity factor given by Amby= $C_1\phi_1+C_2\phi_2+C_3\phi_3$, where $C_1=x_3y_2-x_2y_3$, $C_2=x_1y_3-x_3y_1$, and $C_3=x_2y_1-x_1y_2$, and where ($x_1$, $y_1$) is the spatial location of the second antenna. ($x_2$, $y_2$) is the spatial location of the third antenna, and ($x_3$, $y_3$) is the spatial location of a fourth antenna, and wherein $C_1$, $C_2$ and $C_2$ are constants;

(2) lookup the value of Amby in a precomputed ambiguity table and find associated factors $N_2$ and $N_3$, which correspond to a respective number of integer cycles of RF energy that can occur from the time a plane wavefront hits one of the antennas until this wavefront hits the reference antenna;

(3) compute two unambiguous phase values $\Phi_2$ and $\Phi_3$ using the equations $\Phi_2=\phi_2+N_2$ and $\Phi_3=\phi_3+N_3$; and (4) compute azimuth and elevation angles to the emitter using the equations
elevation angle=$\gamma=\sin^{-1}[(x_3\Phi_2+x_2\Phi_3)/C_1]$, and
azimuth angle=$\psi=\sin^{-1}[y_2\Phi_3+y_3\Phi_2)/C_1/\cos(\gamma)]$.

2. The apparatus of claim 1 wherein values (Amby$_i$) in the ambiguity table are constant for any given locations of the antennas.

3. The apparatus of claim 1 wherein the spatial locations of the antennas, which determines $C_1$, $C_2$ and $C_3$ and hence $K_2$ and $K_3$, are picked so that values (Amby$_i$) in the ambiguity table are unique for each combination of $N_1$, $N_2$ and $N_3$.

4. A method of generating angle of arrival data indicative of the direction of arrival of energy derived from an emitter, said method comprising the steps of:

providing a two dimensional array comprising a reference antenna and second, third and fourth antennas disposed in a predetermined plane with the reference antenna and offset from the reference antenna at locations such that no two antennas lie along a straight line that includes the reference antenna;

detecting RF energy derived from the respective antennas;

making three phase difference measurements ($\phi_1$, $\phi_2$, $\phi_3$) of the RF energy; and processing the phase difference measurements to eliminate ambiguities and determine azimuth and elevation angel of arrival data indicative of the direction of arrival of energy derived from the emitter, with the following steps:

(1) computing an ambiguity factor given by Amby= $C_1\phi_1+C_2\phi_2+C_3\phi_3$, where $C_1=x_3y_2-x_2y_3$, $C_2=x_1y_3-x_3y_1$, and $C_3=x_2y_1-x_1y_2$, and where ($x_1$, $y_1$) is the spatial location of the second antenna, ($x_2$, $y_2$) is the spatial location of the third antenna and ($x_3$, $y_3$) is the spatial location of a fourth antenna where $C_1$, $C_2$ and $C_3$ are constants;

(2) looking up the value of Amby in a precomputed ambiguity table and find associated factors $N_2$ and $N_3$, which correspond to a respective number of integer cycles of RF energy that can occur from the time a plane wavefront hits one of the antennas until this wavefront hits the reference antenna;

(3) computing two unambiguous phase values $\Phi_2$ and $\Phi_3$ using the equations $\Phi_2=\phi_2+N_2$ and $\Phi_3=\phi_3+N_3$; and (4) computing azimuth and elevation angles to the emitter using the equations
elevation angle=$\gamma=\sin^{-1}[(x_3\Phi_2+x_2\Phi_3)/C_1]$, and
azimuth angle=$\psi=\sin^{-1}[y_2\Phi_3+y_3\Phi_2)/C_1/\cos(\gamma)]$;

and wherein the ambiguity table is constructed by determining all possible combinations (M) of $N_i$, $N_2$ and $N_3$ over a field of view of the apparatus using the equation Amby$_i$ =$-N_1-K_2N_2-K_3N_3$, (i=1, 2, ..., M), where $K_2=C_2/C_1$ and $K_3=C_3/C_1$ and $N_1$, $N_2$, and $N_3$, are associated factors.

5. The method of claim 4 wherein values (Amby$_i$) in the ambiguity table are constant for any given locations of the antennas.

6. The method of claim 4 wherein the spatial locations of the antennas, which determines $C_1$, $C_2$ and $C_3$ and hence $K_2$ and $K_3$, are picked so that values (Amby$_i$) in the ambiguity table are unique for each combination of $N_1$, $N_2$ and $N_3$.

* * * * *